UNITED STATES PATENT OFFICE

2,232,595

COATING AND FILM FORMING COMPOSITIONS

Harry Robert Dittmar and Reginald Grice Kennelly, Wilmington, Del., assignors to E. I. du Pont de Nemours & Company, Wilmington, Del., a corporation of Delaware No Drawing. Application May 20, 1938, Serial No. 209,064

6 Claims. (Cl. 260—28)

This invention relates to coating, film forming and sealing compositions and, more particularly, to such compositions containing wax and a polymeric methacrylic acid derivative. The invention likewise relates to a method of preparing these compositions.

An object of the present invention is to provide a coating, film forming and sealing composition containing wax. Another object of the invention is to provide a process of preparing a composition of matter containing a blend of wax and a polymeric derivative of methacrylic acid. Yet another object of the invention is to provide a thermo-sealing, tough, elastic, moisture-, water-, and gas-proof plastic composition of exceptional utility for coating foodstuffs, or other materials subject to dehydration or gaseous deterioration. More specifically, the invention is related to the preparation of a coating or film forming composition containing paraffin wax and a definite amount of a polymeric ester of methacrylic acid, the alcohol group of the ester containing more than 2 carbon atoms. Other objects and advantages of the invention will hereinafter appear.

A wax, such as paraffin wax, which is friable, having no substantial toughness or abrasion resistance, can be converted in accord with the invention to a durable, flexible, and elastic product having characteristics wholly dissimilar to those inherent in a wax. Briefly stated, the above objects are accomplished by dissolving in a wax, such as paraffin, a definite amount of a polymeric derivative of methacrylic acid, the solution being effected under proper conditions. The amount added is critical and is governed, inter alia, by the wax treated and the particular polymeric derivative of methacrylic acid added.

It has been found that the physical properties of a wax, especially with respect to its adhesiveness and wear resistance, are greatly affected by the incorporation therein of from 5 to 15% of a polymeric methacrylic acid derivative, the amount added depending upon the wax and the particular polymeric methacrylic acid resin used. At a concentration of approximately 20% and up of the polymeric derivative the friable structure substantially disappears and is replaced by a tough, elastic structure. The strength of a bond formed by thermal sealing is increased 20 to 50 fold over that of the untreated wax; the elasticity is increased greatly, ordinary wax having substantially no elasticity; while flexibility is remarkably extended. The surprising and unexpected change effected by the addition of the polymeric resin can be appreciated by considering Table I.

Compositions containing different proportions of polymeric methacrylates and paraffin wax were prepared. Blends of these compositions were heated to 200° C. in which 5" x 1½" strips of heavy bond paper were dipped. Two of these strips were then sealed together by placing a ¾" length of the superimposed strips over a surface heated to 110° C., the bond being made by passing a roller three times over the heated section. The thus prepared strips were tested in a Suter testing machine which measures in grams the force necessary to separate the sheets:

TABLE I

| Percent paraffin wax | Percent polymethacrylate | Type polymethacrylate used and force in grams at break | | |
|---|---|---|---|---|
| | | n-Butyl | Isobutyl | n-Propyl |
| | | Grams | Grams | Grams |
| 100 | 0 | Less than 30 | | |
| 97.5 | 2.5 | 50 | | |
| 95 | 5 | 65 | 50 | 50 |
| 90 | 10 | 250 | 190 | 120 |
| 85 | 15 | *800+ | 250 | 240 |

*In this test the bond paper broke without disturbing the bond.

The exact nature of the product resulting from the process of the invention is not clearly understood. It appears to conform to the nature of an alloy or a solid solution. When the polymeric compound is added to the wax, solubility is not immediate but, on the contrary, the polymer appears to swell, pass through a jelly-like stage and, in so doing, a slight increase in the viscosity of the whole mixture results, finally the polymer visibly disappears into the other constituent or constituents of the bath. For optimum results, the polymer should dissolve in the wax although incomplete solubility will, in many instances, give a product having wide utility.

The striking differences illustrated by the above comparative values are more fundamental than the figures indicate. Micrographic examination shows that the polymeric derivatives have the ability to greatly modify the crystal structure of the wax. Under a magnification of 600 diameters, paraffin wax, which has been allowed to crystallize from the molten state to room temperature in about 3 minutes, exhibits a crystal structure that may be defined as elongated plates, with spaces between the plates substantially equal to the size of the plates. A blend containing 40% polymeric n-butyl methacrylate and 60% paraffin crystallized in like manner has a fine compact, spherulitic type growth of much smaller crystals, in the order of ⅕ the size of the crystals of the paraffin wax. Moreover, there appears at this magnification to be substantially no free spaces between the spherulitic crystals.

The waxes which may be used in the composition of the invention include all waxes, whether of vegetable, animal, synthetic and/or mineral origin or mixtures thereof such as, for example, carnauba, candelilla, montan, lanolin, coca butter, cottonseed stearin, Japan wax, bayberry, myrtle, mace, palm kernel, beeswax, spermaceti, Chinese insect, mutton tallow, waxes obtained by the hydrogenation of coconut oils, soy bean and perhaps of more importance, the mineral waxes such as paraffin, ceresin, montan, ozokerite, etc.

The polymeric compounds which may be used in the composition of the invention include the polymeric amides, imides and esters of methacrylic acid. Of this group of polymeric compounds the esters of methacrylic acid are preferred, since they provide exceptionally useful compositions from which excellent sheets and films, as well as filaments, can be formed. The sheets and films have outstanding resistance to penetration of moisture, water and gases and give exceptionally durable, flexible, elastic and tough products not subject to cracking.

As has been indicated above in the general description of the invention, the polymeric compound should preferably dissolve in the wax during heating with stirring. It has been found that methyl and ethyl methacrylates do not dissolve in paraffin wax and that the propyl methacrylates may be stated to be on the border line of solubility in this wax. The n-propyl ester, however, is soluble in paraffin wax if the temperature of the wax is maintained at 215° C. or above, while the isopropyl appears visibly to dissolve at 270° C. The esters higher than propyl such, for example, as n-butyl, isobutyl, cyclohexyl; the amino alcohol esters, such as diethylaminoethyl, dimethylaminoethyl, dicyclohexylaminoethyl, decahydro-β-naphthyl; the methacrylic acid esters of the mixture of alcohols obtained from the catalytic hydrogenation of carbon oxides at elevated temperatures and pressures, and particularly those boiling between 150 and 160° C.; the methacrylic acid esters of the alcohols derived by carboxyl hydrogenation of vegetable oils or vegetable oil acids, e. g., lauryl alcohol, myristyl alcohol, cetyl alcohol, stearyl alcohol, etc.; and, generally, the esters of methacrylic acid higher than ethyl or mixtures thereof, are suitable. The polymeric amides and imides of methacrylic acid which may also be used include the laurylimide, octylimide, monobutyl amide, dibutyl amide and the mono- and di- higher-alkyl amides. Interpolymers or polymeric mixtures may likewise be used, such, for example, as the interpolymers or polymeric mixtures of the esters of methacrylic acid higher than ethyl with polymeric acrylic or methacrylic acid or polymeric derivatives thereof. In such interpolymers or polymeric mixtures the lower esters of acrylic and methacrylic acids such as methyl and ethyl may be used providing the average of the number of carbon atoms in the alkyl group of the ester is greater than 2, e. g., an interpolymer made from a 70/30 mixture of methyl methacrylate and n-propyl methacrylate would have an average of 1.6 carbon atoms on this basis and would not be included while one containing 25/75 methyl methacrylate and n-butyl methacrylate would have an average of 3.25 carbon atoms and would be included. Interpolymers or polymeric mixtures of the methacrylic acid esters of alcohols higher than ethanol with other polymerizable compounds such as the vinyl esters, styrene, etc., if the interpolymer or mixture is soluble in the wax under the designated condition, may be used.

A third component may likewise be added to further modify the characteristics of the composition; as addition agents of this class may be included, natural or synthetic rubber or their halogenated products, gutta percha; asphalt; natural and synthetic resins such as dammar, cumarone-indene, copal, alkyd resins, rosin, balsams; gelatine, glue; the polymeric resins such as vinyl acetate, vinyl chloride, styrene, etc.; the phenol and urea-formaldehyde resins. Suitable plasticizers may be used, if desired, such for example, as dicyclohexyl phthalate, phthalates of the higher alcohols, the cresyl phosphates, para toluene sulfonamide, dibutyl phthalate, octadecanediol monocarbamate, stearyl carbamate, etc.

The temperature at which the apparent solution of the polymer in the wax should be carried out varies in accord with the wax employed and the polymer to be dissolved therein. Moreover, the temperature at which the apparent solution can be effected likewise appears to vary with the molecular weight of the polymer and the presence of plasticizers or addition agents if used. For example, in a series of n-propyl methacrylate polymers having a wide range of molecular weight, it was found that the low molecular weight polymers could be dissolved completely at temperatures above 215° C., while the higher molecular weight polymers required a temperature of about 250° C. to effect complete solubility. This relationship of molecular weight to solubility is believed to hold true for all the esters of methacrylic acid. It may be generally stated that, for the designated esters higher than propyl, apparently complete solution can be effected irrespective of their molecular weight at temperatures of at least 160° C., while, for similar treatment of n-propyl methacrylate, a temperature of at least 215° C. should be employed.

The temperature, at which a paraffin-polymeric methacrylic acid ester solution becomes cloudy on cooling, decreases with increasing molecular weight of the esterified alcohol radical and the desired complete solution of resin in wax can be attained by heating above the clouding temperature which is referred to hereinafter as the "solution temperature". The solution temperature for (40% polymer solution) propyl methacrylate in paraffin wax, the latter having a melting point of 50 to 60° C., is about 240° C.; for butyl methacrylate, 170° C. Complete solubility of the polymeric ester in the wax is not a prerequisite to obtaining the advantages of the invention for it has been found that desirable products can be obtained if the heating is conducted at temperatures of from 75 to 120, although for best utilization of all of the polymeric ester present a temperature in excess of the solution temperature is preferred. Furthermore, the solution temperature of a given methacrylate polymer varies directly with the molecular weight. With n-butyl methacrylate polymer the solution temperature decreases as the concentration of the polymer is increased, a 90% butyl methacrylate, 10% paraffin composition remaining clear down to the solidification temperature.

The more detailed practice of the invention is illustrated by the following examples, in which parts are given by weight unless otherwise stated. There are, of course, many forms of the invention other than these specific embodiments.

*Example I.*—40 parts of n-butyl methacrylate monomer (containing 0.5% benzoyl peroxide) was mixed with 60 parts of melted paraffin, having a melting point of 57–60° C., and the mixture placed in a 100° C. oven. Three days later it was found that the n-butyl methacrylate had polymerized and a portion of the polymer had settled to the bottom in the molten paraffin. The two layers were heated to approximately 180° C. with stirring and apparent complete solution was effected readily.

*Example II.*—The process of Example I was repeated, polymerization being conducted at a temperature of 150° C., and it was found that only a small portion of the resin remained in solution at that temperature, it being necessary to heat the samples to 175° C. or above to give a homogeneous liquid.

The attached Table II illustrates a number of polymeric methacrylic-acid derivative wax blends, prepared by adding the polymeric resin to the molten wax and heating the mixture with stirring to a temperature at which complete solution was effected. This table illustrates the adaptability of the process to produce a variety of compositions. Those illustrated are tough, flexible, extensible and have exceptional heat sealing properties.

composition containing, in the order of 40% polymeric n-butyl methacrylate and 60% paraffin wax, or generally 20-60% polymeric ester and 80-40% wax, may be heated to a molten state and cast upon a suitable surface to form films. Owing to the toughness of films formed of the specified compositions and, also, those designated in the table as numbers 6, 9 and 23, films may be laid down which can be stripped from the film-forming surface to give a product which is tough, readily handled, and can be stacked without blocking. These compositions may be used for wrapping foodstuffs and other materials requiring a moisture-, water- and/or gas-proof protective coating. After wrapping, the overlapping edges may be sealed by applying an iron heated to the proper temperature to fuse the edges together. For coating cheese, fruit, vegetables or materials which require a close, contiguous, protective film, highly successful coatings may be applied by dipping the material, cold or heated to a temperature of 50 to 100° C. below

TABLE II

*Methacrylate resin wax blends*

| No. | Percent wax | Methacrylic acid derivative—percent polymer | Percent other ingredients |
|---|---|---|---|
| 1 | 60 paraffin wax (M. P. 57-60° C.) | 30 butyl | 10 cyclohexyl-phthalate. |
| 2 | 60 paraffin wax (M. P. 57-60° C.) | (20 butyl—20 isobutyl)[4] | |
| 3 | 60 paraffin wax (M. P. 57-60° C.) | 40 isobutyl | |
| 4 | 60 paraffin wax (M. P. 57-60° C.) | 40 isoamyl | |
| 5 | 60 paraffin wax (M. P. 57-60° C.) | (30 butyl—10 isoamyl)[3] | |
| 6 | 60 paraffin wax (M. P. 57-60° C.) | 40 laurylimide of polymethacrylic acid | |
| 7 | 70 paraffin wax (M. P. 57-60° C.) | 20 laurylimide of poly-methacrylic acid—10 butyl[3] | |
| 8 | 60 paraffin wax (M. P. 57-60° C.) | (32 butyl—8 ethyl)[4] | |
| 9 | 60 paraffin wax (M. P. 57-60° C.) | 40 (36 butyl—4 methyl)[4] | |
| 10 | 60 paraffin wax (M. P. 57-60° C.) | 40 propyl (visc. 30%, solution in toluene is 0.02 poises). | |
| 11 | 60 paraffin wax (M. P. 57-60° C.) | 30 butyl | 10 mineral oil. 40 dammar A. |
| 12 | 60 paraffin wax (M. P. 57-60° C.) | | |
| 13 | 60 paraffin wax (M. P. 57-60° C.) | 40 isobutyl | |
| 14 | 60 candelilla | 40 butyl | |
| 15 | 60 beeswax | do | |
| 16 | 60 carnauba | do | |
| 17 | 60 chinese insect | do | |
| 18 | 60 bleached montan | do | |
| 19 | 60 lanolin | do | |
| 20 | 60 parowax | 20 isobutyl | 20 dicyclohexyl phthalate. |
| 21 | 85 paraffin wax (M. P. 57-60° C.) | 15 butyl | |
| 22 | 75 paraffin wax (M. P. 57-60° C.) | 25 butyl | |
| 23 | 25 paraffin wax (M. P. 57-60° C.) | 75 butyl | |
| 24 | 10 paraffin wax (M. P. 57-60° C.) | 90 butyl | |
| 25 | 60 paraffin wax (M. P. 57-60° C.) | 40 butyl | |
| 26 | 60 paraffin wax | 40 esters of alcohols obtained by high pressure synthesis of alcohols boiling between 150-160° C. | |

[3] Mixture of preformed polymers.
[4] Interpolymers.

The compositions of the invention, such as those illustrated, can be used for many purposes such, for example, as a coating composition for the treatment of fibrous materials such as cloth, paper, leather; films or filaments of regenerated cellulose, cellulose acetate, cellulose nitrate, or ethyl cellulose; linoleum, oil cloth, wall board; for the coating of cellular materials such as cement, stone, bricks and the like; for the treatment of more dense materials such as wood, glass and metals, or open materials such as lace, wire screen, etc. By proper control of the composition, it is possible to obtain a coating composition which may be applied to fibrous materials in the form of a molten liquid which may be of such viscosity that it will not strike through the material treated or, contrarywise, if greater penetration is desired, the ratio of wax may be increased to such an extent that substantial penetration of the fibrous material may be effected.

In addition to the above uses, the compositions may be employed for the formation of self-sustaining films and filaments. For example, a the temperature of the molten wax, in the molten composition. This provides an excellent protective coating which can be removed easily.

The compositions of the invention may be dissolved in a suitable solvent or combination of solvents with or without plasticizers and as such may be applied to the surface to be coated. If desired, the formed blend may be dispersed, while in the molten state, by means of a dispersing agent into a nonsolvent, e. g., water, to form an emulsion and the blend applied in that form.

Uses recommended for these compositions include the following:

They are well adapted for the coating of paper to be used as an insulating material, for the wrapping of bread, flowers, etc., for the fabrication of food containers such as paper cups and the like, as a thermoplastic adhesive, for the wrapipng of cartridges, for use as labels and as a dieelectric, e. g., in electric condensers. The compositions likewise may be used for the coating of flexible materials, such as wire, silk, cotton, wool, and the like, and in making oiled silk like products, chintz, semi-chintz and sized and water-repellent fabrics of all kinds.

As has been indicated, foodstuffs may be dipped in the molten blend to form a protective coating thereover which may likewise be applied by brushing, spraying, or otherwise applying the composition to the surfaces of the foodstuffs such, for example, as meat, cheese, fruits, vegetables, nuts and the like.

Rigid objects may likewise be coated to protect them from indoor or outdoor exposure, and for this purpose the products of this invention may be applied, by dipping in the molten composition or by spraying, brushing or dipping a solution or emulsion, to wood or metal, e. g., to the interior of beer cans, metal cans for preserving foods and the like. Stone, concrete, synthetic plastics, tile, plaster, and brick may be similarly treated. Regenerated cellulose film may be coated to render the non-moisture proof grade moisture proof or to alter the flexibility of sheets for application to various uses.

Due to the excellent electrical insulating properties of the compositions, they are exceptionally well adapted for the treating of electric wires, coils, armatures and rotors, and likewise for the treatment of paper insulation to be used in winding condensers and for the final impregnation of the wound condenser.

Floors and floor coverings may be protected preserved and beautified by the use of these compositions, they being well adapted for application to linoleum, wood and tile. As coating compositions, they are likewise suitable for the treatment of leather or botanical and biological exhibits for obtaining desirable surface effects and preservation.

As adhesives the polymeric methacrylic acid derivative-wax blends may be applied as a melt, solution, emulsion, or as an unsupported or supported film, and may be used for joining or laminating any combination of the following materials: wood, stone, paper, cloth, regenerated cellulose film, leather, metal, rubber, glass, synthetic resins, cellulose derivatives and cork.

The tough, abrasion-resistant compositions of the invention find utility in polishes and waxes used for polishing automobiles, furniture, shoes and the like. Because of the ease with which they may be cast, molded or cold pressed, they may be formed into shaped articles by pouring melts thereof into forms, by injection or compression molding or by cold pressing to produce shaped articles or to take impressions, as in dental uses.

When used for the impregnation of porous rigid materials such as wood, stone, plaster and the like, they may be applied from solution or emulsion, or as a melt; or, if desired, a solution of the wax containing the monomeric methacrylic derivative may be applied, followed by subsequent polymerization of the resin, in situ, by raising the temperature to the proper degree.

Emulsions of the methacrylate polymer blends are likewise applicable to the sizing of paper, as a pigment adhesive, as a size to control paste penetration of labels, to effect the moisture proofing of paper bags, paper carton liners, cardboard and the like and for addition to insecticides as an extender and fixative.

Due to the unusual strength of the compositions, it is possible to use them as supported or unsupported films which may be prepared by pouring a melt of the blend upon a suitable base material followed by stripping and rolling up the thus stripped film. If a supported film is required, the stripped film is superimposed upon a support such as paper, rubber, cloth or other suitable supporting material. The films may likewise be formed by extruding the molten material through slits into a cold, non-solvent bath or into a refrigerated room or by cold-rolling or stretching a block of the composition to the desired film thickness.

Supported or unsupported films prepared as above described are useful for the wrapping of materials, as tree-grafting tape, for insulation, as thermoplastic adhesives, for surface layers calendered on paper, cloth, rubber and the like, and for therapeutic uses to prevent drying out of wounds, surgical dressings and the like.

For the above applications, the polymeric methacrylic acid derivative-wax blends may be suitably modified with pigments, fillers, dyes, and/or plasticizers, resins and the like. Moreover, these blends may be added in suitable amounts to paraffin after its extraction from petroleum oils, whereby the quality of the wax may be controlled and blistering and the growth of large crystals prevented.

An outstanding characteristic of these methacrylate wax blends appears to be that, for adhesive purposes, particularly when the bond is made by applying heat, paraffin exudes to a certain extent from the bond to leave, it appears, as the bonding material, the polymeric ester combined with more or less wax. Although bonding of this type may be carried out at temperatures well below the melting point of the polymeric methacrylic acid derivative present, an excellent bond is obtained which makes it possible to apply the methacrylate-wax blends as bonding materials to give an exceedingly firm bond which heretofore required the application of exceptionally high temperatures and the use of expensive raw materials.

In consideration of the above specification, it will be realized that many changes may be made in the details therein given without departing from the scope of the invention or sacrificing any of the advantages that may be derived therefrom.

I claim:

1. A wax-polymer blend containing per 100 parts by weight, at least 60 parts of a mineral wax, and at least 15 parts of a polymeric alkyl methacrylate, the alkyl group of which contains more than 2 carbon atoms.

2. A wax-polymer blend containing per 100 parts by weight at least 60 parts of paraffin wax and at least 15 parts of a polymeric alkyl methacrylate, the alkyl group of which contains more than 2 carbon atoms.

3. A wax-polymer blend containing per 100 parts by weight, at least 60 parts of paraffin and at least 15 parts of polymeric n-butyl methacrylate.

4. A wax-polymer blend containing per 100 parts by weight, at least 60 parts of paraffin wax and at least 15 parts of polymeric isobutyl methacrylate.

5. A wax-polymer blend consisting of 60 parts by weight of paraffin wax and 40 parts by weight of polymeric n-butyl methacrylate.

6. A wax-polymer blend consisting of 60 parts by weight of paraffin wax and 40 parts by weight of polymeric isobutyl methacrylate.

HARRY ROBERT DITTMAR.
REGINALD GRICE KENNELLY.